US012755873B2

(12) United States Patent
Chong

(10) Patent No.: US 12,755,873 B2
(45) Date of Patent: Oct. 6, 2026

(54) PASSIVE-TYPE HARMONIC REMOVAL DEVICE AND METHOD FOR MANUFACTURING SAME

(71) Applicant: THE THINKING LION CO., LTD., Gyeonggi-do (KR)

(72) Inventor: Jungyong Chong, Seoul (KR)

(73) Assignee: THE THINKING LION CO., LTD., Gyeonggi-do (KR)

( * ) Notice: Subject to any disclaimer, the term of this patent is extended or adjusted under 35 U.S.C. 154(b) by 320 days.

(21) Appl. No.: 18/577,679

(22) PCT Filed: Jul. 8, 2022

(86) PCT No.: PCT/KR2022/009992

§ 371 (c)(1),
(2) Date: Jan. 8, 2024

(87) PCT Pub. No.: WO2023/282709

PCT Pub. Date: Jan. 12, 2023

(65) Prior Publication Data

US 2024/0321486 A1 Sep. 26, 2024

(30) Foreign Application Priority Data

Jul. 9, 2021 (KR) ........................ 10-2021-0090419

(51) Int. Cl.

| | |
|---|---|
| ***H01B 3/10*** | (2006.01) |
| ***H01B 17/54*** | (2006.01) |
| ***H02J 1/02*** | (2006.01) |
| ***H02J 3/01*** | (2006.01) |

(52) U.S. Cl.

CPC ................ *H01B 17/54* (2013.01); *H02J 1/02* (2013.01); *H02J 3/01* (2013.01); *H01B 3/105* (2013.01)

(58) Field of Classification Search

CPC ... H01B 1/02; H01B 1/04; H01B 1/08; H01B 7/42; H01B 7/421; H01R 11/20; H01R 13/03; H01R 13/10; H01R 13/66; H01R 13/70; H01R 13/73; C22C 30/00; B60L 11/1875

USPC ...... 174/74 R–88 C; 333/125, 245; 439/394, 439/578; 324/72.5

See application file for complete search history.

(56) References Cited

U.S. PATENT DOCUMENTS 3,602,872 A * 8/1971 Braunstein ........... H01R 4/2406 337/201
6,362,709 B1 * 3/2002 Paxman .................... H01P 5/02 333/125
2015/0142237 A1 * 5/2015 Wu ......................... B60L 1/003 701/22

FOREIGN PATENT DOCUMENTS

JP 2017208996 A 11/2017
KR 101147195 B1 5/2012
KR 101596645 B1 2/2016

(Continued)

OTHER PUBLICATIONS

International Search Report, PCT/KR2022/009992, Oct. 26, 2022, 4 pages.

*Primary Examiner* — William H. Mayo, III

(57) ABSTRACT

A passive-type harmonic removal device, wherein the intensities of all the $2^{nd}$ to $50^{th}$ harmonics present in an electric line are simultaneously reduced through a material part which includes N (N>2) materials and is connected to the electric line in an electrically insulated state to receive and remove thermal energy of the electric line.

14 Claims, 4 Drawing Sheets

(a) (b)

(56) References Cited

FOREIGN PATENT DOCUMENTS

| | | | | | |
|---|---|---|---|---|---|
| KR | 20200053667 | A | * | 5/2020 | ............. C22C 30/00 |
| KR | 20210092639 | A | | 7/2021 | |
| KR | 20210156378 | A | | 12/2021 | |
| KR | 102853182 | B1 | * | 9/2025 | ............... H01B 1/08 |
| WO | 2012023677 | A1 | | 2/2012 | |

* cited by examiner (a)

(b)

| CATEGORY | 2TH(%) | 3TH(%) | 4TH(%) | 5TH(%) | 6TH(%) | 7TH(%) | 8TH(%) | 9TH(%) | 10TH(%) | 11TH(%) |
|---|---|---|---|---|---|---|---|---|---|---|
| BEFORE INSTALLING | 3.37 | 3.21 | 2.47 | 9.43 | 3.00 | 3.73 | 3.39 | 2.83 | 2.80 | 3.29 |
| AFTER INSTALLING | 1.12 | 1.15 | 0.72 | 6.45 | 0.71 | 1.39 | 0.95 | 0.61 | 0.63 | 1.10 |
| REDUCTION RATE | -66.66% | -64.14% | -71.07% | -31.66% | -76.43% | -62.74% | -71.93% | -78.55% | -77.69% | -66.56% |

| CATEGORY | 12TH(%) | 13TH(%) | 14TH(%) | 15TH(%) | 16TH(%) | 17TH(%) | 18TH(%) | 19TH(%) | 20TH(%) | THDi(%) |
|---|---|---|---|---|---|---|---|---|---|---|
| BEFORE INSTALLING | 2.72 | 3.01 | 2.69 | 2.80 | 3.13 | 2.70 | 3.03 | 2.68 | 3.70 | 20.07 |
| AFTER INSTALLING | 0.79 | 1.11 | 0.75 | 0.68 | 0.71 | 0.71 | 0.68 | 0.79 | 0.97 | 10.38 |
| REDUCTION RATE | -71.13% | -63.05% | -71.97% | -75.86% | -77.21% | -73.55% | -77.46% | -70.55% | -73.73% | -48.27% |

PASSIVE-TYPE HARMONIC REMOVAL DEVICE AND METHOD FOR MANUFACTURING SAME

TECHNICAL FIELD

The present disclosure relates to providing a passive type harmonic removal device capable of removing harmonics inside an electric line or reducing intensities of the harmonics by a method of removing thermal energy existing inside the electric line to lower kinetic energy of the harmonics.

BACKGROUND ART

One of the difficult problems that have not yet been solved after Edison developed a practical light bulb and Tesla developed an Alternating Current (AC) motor is the problem of removing harmonics.

Harmonics are sine waves with frequencies that are integer multiples of the fundamental frequency (50 Hz or 60 Hz) in AC electricity, and harmonics grow or shrink as they meet, like multiple waves grow larger when heading in a similar direction and shrink or disappear when they collide with each other. In other words, harmonics have the characteristic of increasing in magnitude through a process of overlapping and being reflected while moving like a fluid within lines.

Harmonics are mainly generated while semiconductor power conversion equipment, transformers, and rotors operate with the nonlinear characteristics. Major sources are a silicon controlled reactor (SCR) AC phase controllers (Heater), Uninterruptible Power Systems (UPS), lighting equipment (DIMMER), inverters (V.V.V.F), DC power systems/chargers, AC/DC inverters, frequency converters, arc furnaces, induction furnaces, welding machines, office equipment, home appliances, etc.

Harmonics cause damage, such as voltage rise, power factor deterioration, resonance generation, magnetic saturation generation in the instrument core, error generation in the instrument, overheating of the power equipment, temperature increase of the transformer, vibration/noise generation, reduction in transformer and cable capacity, capacitor/reactor burnout, overheating of the transformer, wrong operation of the parallel resonance system relay, power fuse blowing, capacitor burnout (terminal voltage rise), device efficiency deterioration, etc. Typically, harmonics are generated from $2^{nd}$ (for example, 120 Hz at the fundamental frequency 60 Hz of AC electricity) to $50^{th}$ (for example, 3 Khz at the fundamental frequency 60 Hz of AC electricity). The International Electrotechnical Commission (IEC) recommends that the $2^{nd}$ harmonic to the $37^{th}$ harmonic (for example, 2.22 Khz at the fundamental frequency 60 Hz of AC electricity) should be managed to be less than 5%. However, it has been reported that malfunctions occur even when the harmonic rate is as low as 3%. Due to the characteristics of harmonics, the amplitude of odd-numbered orders is usually larger than that of even-numbered orders, and accordingly, conventional harmonic filter devices have the function of removing only odd-numbered orders.

Conventional harmonic removal technology includes a passive harmonic removal device that uses the resonance principle and an active harmonic removal device that cancels out all harmonics by applying inverse harmonics. Representative conventional passive harmonic removal devices include reactors, K-Factor transformers, electronic reactive power compensation devices, and neutral line zero harmonic reduction devices. Meanwhile, the conventional passive harmonic removal devices have the problem of not being able to remove $2^{nd}$ to $50^{th}$ harmonics at once. Accordingly, the conventional passive harmonic removal devices have the problem of having to install a reactor individually for each harmonic, making it difficult to use widely in reality. Particularly, there are difficulties in application to high-current or high-voltage facilities due to the great wire thickness and product sizes. In addition, the conventional harmonic removal technology has a short lifespan of 3 to 5 years, generates noise and vibration, requires high installation cost and large space, and has a very low removal rate of 20% to 30%, which are technical limitations.

Meanwhile, the conventional active harmonic filter devices have the ability to remove up to 90% of $2^{nd}$ to $50^{th}$ harmonics. The use of active harmonic filter devices has recently been increasing, but the penetration rate is less than 1% due to the fact that the price is very expensive and the installation location is required wherever the line branches. Particularly, industrial factories with irregular machine operation patterns are reluctant to install the active harmonic filter devices due to the high price and concerns about abnormal oscillations that may occur, and the harmonic removal rate in actual sites is as low as 40%. Accordingly, the active harmonic filter devices are not widely preferred.

For these reasons, the conventional passive/active harmonic removal devices are mainly limited to application to mechanical devices that use low power, and there are no harmonic removal devices that can be currently installed in industrial factories equipped with mechanical devices using high voltages.

Meanwhile, because all the conventional harmonic filters are composed of electronic components and are greatly affected by frequency and impedance, the conventional harmonic filters have low removal rates of 30% to 20% or less and are unstable. Also, the conventional harmonic filters could not remove all orders of harmonics. Meanwhile, the IEC recommends managing $2^{nd}$ to $37^{th}$ harmonics because the harmonics affect power quality, but the conventional harmonic filters have difficulties in managing up to the $37^{th}$ harmonics in physical and price aspects. Therefore, it is necessary to research a harmonic removal technology and removal device based on a new technical principle that can stably remove all orders of harmonics at once without being affected by impedance and can be used even at high voltages by solving all of the above problems.

DISCLOSURE

Technical Problem

It is an object of the disclosure to provide a passive harmonic removal device for simultaneously reducing intensities of all $2^{nd}$ to $50^{th}$ harmonics existing on an electric line through a material part connected to the electric line in an electrically insulated state and including N (N≥2) materials to which thermal energy of the electric line is conducted and which remove the thermal energy.

Technical Solution

A passive harmonic removal device according to the present disclosure may be configured to simultaneously reduce intensities of all $2^{nd}$ to $50^{th}$ harmonics existing on an electric line through a material part connected to the electric line in an electrically insulated state and including N (N≥2) materials to which thermal energy of the electric line is conducted and which remove the thermal energy.

In the passive harmonic removal device according to the present disclosure, the material part may be in close contact with an electrode part made of a material having electrical conductivity and thermal conductivity, and thermal energy of the electric line electrically connected to the electrode part may be conducted to the material part and removed by the material part.

In the passive harmonic removal device according to the present disclosure, the material part may be configured to remove thermal energy generated in the electric line and primarily conducted to the electrode part.

In the passive harmonic removal device according to the present disclosure, the material part may be configured to remove thermal energy generated in a designated source electrically connected to the electric line, primarily conducted to the electric line, and then secondarily conducted to the electrode part.

In the passive harmonic removal device according to the present disclosure, the material part may be maintained in a thermal equilibrium state corresponding to surface temperature within a preset allowable temperature range with respect to temperature of the electric line while power of the electric line is applied to the electrode part.

In the passive harmonic removal device according to the present disclosure, the material part may be maintained in a thermal equilibrium state corresponding to surface temperature below atmosphere temperature while power of the electric line is applied to the electrode part.

In the passive harmonic removal device according to the present disclosure, the material part may be maintained in a thermal equilibrium state corresponding to surface temperature within a preset temperature range in a range of 18° C. to 35° C. while power of the electric line is applied to the electrode part.

In the passive harmonic removal device according to the present disclosure, when surface temperature of the material part is outside the thermal equilibrium state, the material part may be maintained in the thermal equilibrium state by increasing a volume or surface area of the material part by multiply-connecting a plurality of material parts to the electric line by a preset electrical connection method.

In the passive harmonic removal device according to the present disclosure, the N materials may include n ($1 \le n \le N$) materials through which no current flows and which have magnetism to prevent short circuit between terminals.

In the passive harmonic removal device according to the present disclosure, the N materials may be maintained in a state of being pulverized into a preset particle size range and distributed uniformly in the material part.

In the passive harmonic removal device according to the present disclosure, the material part may be maintained in a state hardened by mixing the N materials pulverized into the preset particle size range with a preset binder while matching with a preset weight % ratio range and drying the mixture.

In the passive harmonic removal device according to the present disclosure, the binder may be configured to prevent the N materials from contacting oxygen in an atmosphere.

In the passive harmonic removal device according to the present disclosure, the material part may be maintained in a hardened state within a compressive strength range of at least 85 kgf/cm$^2$ or more.

In the passive harmonic removal device according to the present disclosure, the material part may include characteristics of causing no crack at a low voltage while a voltage of 1,000 V or more is applied to the electrode part for one minute or more, or characteristics of causing no crack at a high voltage while a voltage of 12,000 V or more is applied to the electrode part for one minute or more.

In the passive harmonic removal device according to the present disclosure, the N materials may include oxides having electrical insulation characteristics and thermal energy removal characteristics.

In the passive harmonic removal device according to the present disclosure, the oxides may be prevented from contacting oxygen in the atmosphere through the preset binder, in the state of being pulverized into the preset particle size range and bonded or hardened through the preset binder, and thereby, additional oxidation reactions may be prevented.

In the passive harmonic removal device according to the present disclosure, the oxides may include aluminum oxide ($Al_2O_3$), and further include at least one metal oxide of iron oxide ($Fe_2O_3$), magnesium oxide (MgO), or silicon dioxide ($SiO_2$).

In the passive harmonic removal device according to the present disclosure, the N materials may contain at least 30 weight % of aluminum oxide ($Al_2O_3$).

The passive harmonic removal device according to the present disclosure may include a case that accommodates the material part and is maintained in contact with at least one area of surface areas of the material part, the case being made of a thermally conductive material.

A method of manufacturing a passive harmonic removal device according to the disclosure may include a first operation of preparing N ($N \ge 2$) materials for implementing electrical insulation characteristics and thermal energy removal characteristics, a second operation of pulverizing the prepared N materials into a preset particle size range, a third operation of mixing the pulverized N materials with a binder to produce a liquid mixture liquefied, a fourth operation of pouring the liquid mixture into a case including M ($M \ge 1$) electrode parts electrically connected to an electric line and configured to conduct thermal energy to cause the liquid mixture to be in close contact with the electrode parts, and a fifth operation of drying the liquid mixture while causing the liquid mixture to be maintained in close contact with the electrode parts.

In the method of manufacturing the passive harmonic removal device according to the present disclosure, the first operation may include preparing i ($i \ge 1$) raw materials including the N materials each matching with a preset weight % ratio range.

In the method of manufacturing the passive harmonic removal device according to the present disclosure, the first operation may include preparing j ($j \ge 1$) raw materials including s ($1 \le s \le N$) materials among the N materials and preparing t ($1 \le t \le N$) materials for matching weight % for each of the s materials with a preset weight % ratio range.

Advantageous Effects

According to the disclosure, by connecting the passive harmonic removal device according to the disclosure to an electric line to remove thermal energy inside the electric line, intensities of all harmonics in the electric line may be reduced by 65% or more. The removal rate may be a reduction rate that is higher than that of active harmonic filters in industrial factories. Accordingly, advantages of preventing a fire or burnout due to excessive current supply to neutral lines, suppressing deterioration of electronic components, lowering a failure rate, and reducing power loss may be obtained.

According to the disclosure, when the harmonic removal device according to the present disclosure is installed in various electrical devices, a control panel or the entire area of a factory, a failure rate may be lowered by 90% or more. For example, according to the applicant's experiment, as a result of installing the harmonic removal device according to the present disclosure in an automobile parts production factory, a situation where a production line has stopped for no reason about 3 to 4 times a month can be reduced to occur less than once every 6 months. Meanwhile, a conventional passive harmonic filter of an electrical circuit type is affected by impedance and needs to configure a circuit for each order of harmonics, whereas, because the harmonic removal device according to the disclosure uses a method of removing thermal energy in lines, the harmonic removal device may be used in all frequency bands of Hz to Ghz without being affected by impedance and also have an additional advantage of removing high frequency noise.

According to the disclosure, installing the harmonic removal device according to the disclosure in Concent and Multi Tap may provide advantages of removing harmonics generated in each electric device (for example, a Personal Computer (PC), an air conditioner, a refrigerator, etc.) that receives power through the Concent and Multi Tap, and removing harmonics generated in a designated source (for example, another electric device) in a region to which the electric device is connected, and entered the electric device along an electric line.

A harmonic removal technology according to the present disclosure is an essential technology for the stable operation of various sensors used in autonomous vehicles, electric vehicles, smart cities, and smart factories in the era of the Fourth Industrial Revolution. Sensors are vulnerable to signal distortion and noise, and harmonics are a major cause of signal distortion and noise. 95% or more of noise generated in electric lines is caused by harmonics. Therefore, the passive harmonic removal device according to the present disclosure may have an advantage of enabling stable sensor operations and stable protection of signals from noise.

According to the present disclosure, because the passive harmonic removal device according to the present disclosure is composed of an electrode part connected to an electric line and a material part containing metal oxide, the passive harmonic removal device may be very resistant to shock and vibration and may not cause deterioration to provide stable performance even after 30 years or more.

According to the disclosure, because the passive harmonic removal device according to the disclosure can be manufactured with various shapes and sizes (for example, volumes or surface areas) depending on power usage capacity or use purposes, the passive harmonic removal device may be installed without changing equipment structures or circuitries.

According to the present disclosure, the passive harmonic removal device according to the present disclosure can reduce thermal noise or short noise inherently existing in a communication line by removing thermal energy in the communication line.

MODES OF THE INVENTION

A passive harmonic removal device according to the disclosure may simultaneously reduce intensities of all $2^{nd}$ to $50^{th}$ harmonics existing on an electric line through a material part connected to the electric line in an electrically insulated state and including N (N≥2) materials to which thermal energy of the electric line is conducted and which remove the thermal energy.

Modes of the Invention

Hereinafter, the operation principle of the preferred embodiments of the present disclosure will be described in detail with reference to the accompanying drawings and description. It should be understood, however, that the drawings and the following description relate to preferred embodiment methods among various methods for effectively describing features of the present disclosure, and the present disclosure is not limited to the drawings and the following description.

That is, it should be clearly stated that the following embodiments correspond to embodiments in a preferred union form among many embodiments of the present disclosure, and, in the following embodiments, an embodiment of omitting a specific component, an embodiment of dividing a function implemented in a specific component into specific components, an embodiment of integrating a function implemented in two or more components into any one component, an embodiment of changing an operation order of a specific component, etc. belong to the scope of right of the disclosure although not mentioned in the following embodiments. Therefore, it should be clearly stated that various embodiments corresponding to subsets or complementary sets based on the following embodiments can be subdivided based on the filing date of the present disclosure.

In the following description of the present disclosure, a detailed description of known functions or configurations incorporated herein will be omitted when it may make the subject matter of the present disclosure rather unclear. In addition, the terms described below are defined in consideration of the functions of the present disclosure, which may vary depending on the intention or custom of a user or operator. Therefore, definitions of these terms should be made based on the contents throughout the disclosure.

As a result, the technical idea of the present disclosure is determined by the claims, and the following embodiments are merely means for efficiently explaining the advanced technical idea of the present disclosure to persons having ordinary skill in the art to which the present disclosure belongs.

Figure 1:
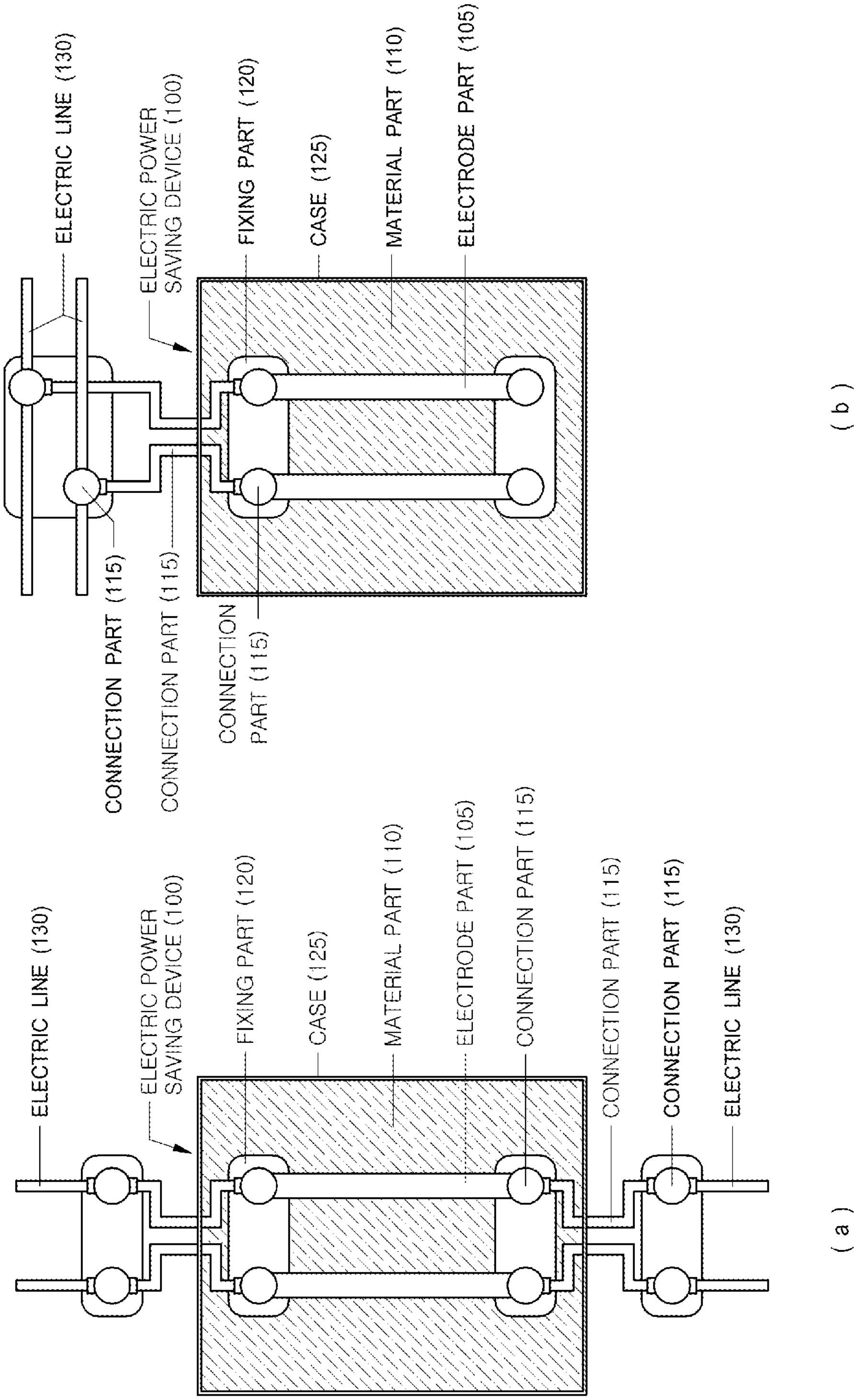
FIG. 1 shows a configuration of a passive harmonic removal device 100 according to an embodiment method of the disclosure.

FIG. 1 shows a configuration of a passive harmonic removal device 100 according to an embodiment method of the disclosure.

More specifically, FIG. 1 shows an embodiment of a passive harmonic removal device 100 which is connected to an electric line 130, to which thermal energy of the electric line 130 is conducted in an electrically insulated state of the passive harmonic removal device 100, and which removes the thermal energy, thereby simultaneously reducing intensities of all $2^{nd}$ to $50^{th}$ harmonics existing on the electric line 130. Persons of ordinary skill in the art to which the present disclosure belongs will be able to infer various embodiment methods (for example, embodiments of omitting, subdividing or combining some components) for a configuration of the passive harmonic removal device 100 by referring to and/or changing FIG. 1, the present disclosure may include all the inferred embodiment methods, and the technical feature of the present disclosure is not limited only to the embodiment method shown in FIG. 1.

(a) of FIG. 1 shows a configuration of a serial harmonic removal device 100 connected in series to the electric line 130, and (b) of FIG. 1 shows a configuration of a parallel harmonic removal device 100 connected in parallel to the electric line 130. For example, the serial harmonic removal device 100 may be installed in power supplies of various electric devices using electricity to reduce intensities of harmonics generated through the electric devices or all harmonics entered the electric devices along the electric line 130. Or, the serial harmonic removal device 100 may be installed in a socket to reduce intensities of harmonics generated through devices using power that is supplied through the socket or all harmonics entered the electric devices along the electric line 130. Meanwhile, the parallel harmonic removal device 100 may be installed in a secondary side of a switch board or a distribution panel in an industrial factory to reduce intensities of harmonics generated indoors through the switch board or distribution panel or harmonics entered the electric devices along the electric line 130.

The harmonic removal device 100 according to the present disclosure may include a material part 110 connected to the electric line 130 in an electrically insulated state and including N (N≥2) materials to which thermal energy of the electric line 130 is conducted and which remove the thermal energy, wherein thermal energy of the electric line 130 may be conducted to the material part 110 and the material part 110 may remove the thermal energy, thereby removing at least a part of harmonics existing on the electric line 130 or reducing intensities of the harmonics. Meanwhile, the harmonic removal device 100 may further include an electrode part 105 electrically connected to the electric line 130 and made of a material having electrical conductivity and thermal conductivity, and the material part 110 may be in close contact with the electrode part 105 to remove thermal energy of the electric line 130 while being electrically insulated from the electric line 130. Meanwhile, the harmonic removal device 100 may further include a case 125 that accommodates the material part 110 and is maintained in contact with at least one area of surface areas of the material part 110.

The electric line 130 is a general term of a line that receives and supplies designated power, and may include a material having electrical conductivity and thermal conductivity. According to an embodiment method of the disclosure, the electric line 130 may receive alternating current power from a switch board or distribution panel, and supply the alternating current power. Meanwhile, the alternating current power may include a voltage, current, and frequency designated by country and/or application (for example, for home or industrial use).

The electrode part 105 is a general term of a component electrically connected to the electric line 130 and having both electrical conductivity characteristics of conducting electricity applied to the electric line 130 and thermal conductivity characteristics of conducting thermal energy generated in the electric line 130 or a designated source (for example, various electric devices using electricity) connected to the electric line 130. The electrode part 105 may be included at a preset location inside the material part 110, and maintained in close contact with the material part 110.

According to an embodiment method of the disclosure, the electrode part 105 may include at least one of metal materials having both electrical conductivity characteristics and thermal conductivity characteristics. Preferably, the electrode part 105 may include the same material as the electric line 130, or a material having electrical conductivity and thermal conductivity that are equal to or higher than those of the electric line 130 within a preset range.

According to an embodiment method of the disclosure, it may be preferable that the electrode part 105 has a surface area per unit length that is larger than or equal to a surface area per unit length of the electric line 130. Accordingly, the electrode part 105 may more efficiently conduct thermal energy transferred from the electric line 130 to the material part 110 being in close contact with the electrode part 105 to remove the thermal energy.

The material part 110 may include the electrode part 105 at a preset location spaced apart by a preset distance or more from the surface area, and the material part 110 may be maintained in close contact with a surface area of the electrode part 105. The material part 110 may include N materials for implementing electrical insulation characteristics and thermal energy removal characteristics of removing thermal energy inside the electric line 130, conducted to the electrode part 105.

According to an embodiment method of the disclosure, the material part 110 may remove thermal energy generated in the electric line 130 and primarily conducted to the electrode part 105. Also, the material part 110 may remove thermal energy generated in a designated source (for example, various electric devices using electricity) connected to the electric line 130, primarily conducted to the electric line 130, and then secondarily conducted to the electrode part 105. Meanwhile, the thermal energy conducted to the electrode part 105 may include thermal energy generated by harmonic noise, and may further include at least one among thermal energy generated by resistance of the electric line 130, thermal energy generated by starting current, thermal energy generated by 3-phase inequilibrium, thermal energy generated in various electric devices using electricity, or thermal energy generated by a phase difference of inductive load.

Meanwhile, according to an embodiment method of the disclosure, in regard of the remaining thermal energy (for example, thermal energy generated by starting current, thermal energy generated by 3-phase inequilibrium, thermal energy generated in various electric devices using electricity, thermal energy generated by the phase difference of inductive load, etc.) excluding thermal energy generated by harmonics and thermal energy generated by the flow of current among thermal energy conducted to the electrode part 105, a source generating the corresponding thermal energy includes a component (for example, a cooling fin, a cooling fan, a cooling device, etc.) for removing the generated thermal energy, and accordingly, a percentage of the remaining thermal energy conducted to the electrode part 105 may be smaller than a preset percentage except for special environments (for example, an environment using an electric furnace, etc.). Meanwhile, in regard of thermal energy generated by resistance of the electric line 130, a percentage of the thermal energy generated by the resistance of the electric line 130 may be maintained at a smaller percentage than a preset percentage, unless excessive power is temporarily used or the resistance of the electric line 130 temporarily increases. However, when a harmonic source (for example, a motor including an inverter, an uninterruptible power supply, etc.) generating harmonics exists in a region including the harmonic removal device 100 according to the disclosure, thermal energy conducted to the electrode part 105 may include thermal energy generated by harmonic noise.

Meanwhile, according to studies by the applicant, the following correlation between harmonics and thermal energy was found. According to studies by the applicant, it was confirmed that, when heat inside the electric line 130 is not removed, a harmonic noise level increases due to a combination of multiple harmonics and a recombination of heat inside the electric line 130 to activate (or increase) thermal energy which is kinetic energy. That is, when harmonics are maintained (or enter) without removing thermal energy inside the electric line 130 while thermal energy (for example, one or more thermal energy among thermal energy generated by harmonic noise, thermal energy generated by the resistance of the electric line 130, thermal energy generated by starting current, thermal energy generated by 3-phase inequilibrium, and thermal energy generated in various electric devices using electricity, or thermal energy generated by the phase difference of inductive load) caused by a heat source exists inside the electric line 130, the thermal energy inside the electric line 130 is activated (or increased) due to a combination of multiple harmonics and a recombination of heat inside the electric line 130. On the other hand, it was confirmed that, when thermal energy inside the electric line 130 is removed or thermal equilibrium is maintained, the intensities of all harmonics (for example, $2^{nd}$ to $50^{th}$ harmonics) inside the electric line 130 are reduced by 65% or more. Meanwhile, when thermal energy inside the electric line 130 is removed, a resistance component on the electric line 130 may also be reduced to achieve additional power saving of about 6% to 20%. The thermal energy removal characteristics of the material part 110 may remove harmonics of the electric line 130 and reduce the resistance component on the electric line 130 to thereby provide a power saving function. Particularly, the thermal energy removal characteristics of the material part 110 may provide characteristics of simultaneously reducing intensities of $2^{nd}$ to $50^{th}$ harmonics existing in the electric line 130 by a preset ratio or more.

The material part 110 may absorb thermal energy conducted to the electrode part 105 through conduction and/or may absorb thermal energy conducted to the electrode part 105 through conduction and then remove the thermal energy by emitting the thermal energy, thereby removing the thermal energy of the electric line 130 connected to the electrode unit 105. Meanwhile, the material part 110 may be maintained in a thermal equilibrium state within a preset temperature range while removing thermal energy conducted to the electrode part 105.

While an electric device operates, internal temperature of the electric line 130 may be higher than internal temperature of the material part 110, and the material part 110 may absorb thermal energy conducted to the electrode part 105 through the electric line 130 to thereby remove the thermal energy. The thermal energy absorbed through the material part 110 may be conducted uniformly to all areas within the material part 110 by thermal conductivity of the material part 110, and may be used to maintain a thermal equilibrium state which maintains surface temperature of each area of the material part 110 in an equal temperature range within a tolerance range. This process may be accomplished when the internal temperature of the electric line 130 is in a temperature range of about 18° C. to 35° C. Meanwhile, when atmosphere temperature around the material part 110 is lower than surface temperature of the material part 110, at least a part of thermal energy absorbed in the material part 110 may be emitted to the atmosphere through each exposed surface area of the material part 110 or a thermally conductive material of the case 125 being in contact with the surface of the material part 110 and be removed. In this case, surface temperature of each area of the material part 110 may also be maintained in a thermal equilibrium state.

Meanwhile, surface temperature of the material part 110 and temperature of thermal energy conducted to the electrode part 105 may be maintained in a thermal equilibrium state of a matched temperature range within a preset allowable temperature range. For example, when temperature of the electrode part 105 is 23° C., surface temperature of the material part 110 may be maintained in a thermal equilibrium state within a preset temperature range based on the temperature of 23° C. In this case, the material part 110 may absorb thermal energy conducted to the electrode part 105 through conduction and conduct the thermal energy uniformly to each internal area, thereby using the thermal energy to maintain a thermal equilibrium state of the material part 110 or removing the thermal energy by emitting the thermal energy to the atmosphere through each exposed surface area of the material part 110 or the thermally conductive material of the case 125.

According to a first embodiment related to surface temperature of the material part 110 that removes thermal energy of the electrode part 105 while power of the electric line 130 is applied to the electrode part 105, the material part 110 may be maintained in a thermal equilibrium state corresponding to surface temperature below atmosphere temperature around the material part 110 while the power of the electric line 130 is applied to the electrode part 105. For example, when atmosphere temperature around the material part 110 is 23° C., surface temperature of the material part 110 may be maintained at 23° C. or less.

According to a second embodiment related to surface temperature of the material part 110, the material part 110 may be maintained in a thermal equilibrium state corresponding to surface temperature within a preset temperature range in a range of 18° C. to 35° C. while the power of the electric line 130 is applied to the electrode part 105.

When surface temperature of the material part 110 is outside the temperature range of 18° C. to 35° C., the present disclosure may manage atmosphere temperature around the material part 110 to maintain the temperature range of 18° C. to 35° C., thereby matching the surface temperature of the material part 110 with the temperature range of 18° C. to 35° C.

Meanwhile, when surface temperature of the material part 110 is outside the thermal equilibrium state corresponding to the temperature range of 18° C. to 35° C. even though atmosphere temperature around the material part 110 is maintained in the temperature range of 18° C. to 35° C., the present disclosure may multiply-connect a plurality of electrode parts 105 being in close contact with a plurality of material parts 110 to the electric line 130 by a preset electrical connection method (for example, a serial connection method, a parallel connection method, or a combined connection method of series connection and parallel connection) to increase a volume or surface area of the material part 110, thereby maintaining the surface temperature of the material part 110 in the thermal equilibrium state corresponding to the temperature range of 18° C. to 35° C. Meanwhile, although the surface temperature of the material part 110 maintains the thermal equilibrium state corresponding to the temperature range of 18° C. to 35° C., the present disclosure may increase a volume or surface area of the material part 110 by multiply-connecting the plurality of electrode parts 105 being in close contact with the plurality of material parts 110 to the electric line 130 by the preset electrical connection method, to stably maintain the thermal energy removal characteristics of the material part 110.

Meanwhile, the N materials included in the material part 110 may be pulverized into a preset particle size range (for example, a particle size of 100 mesh or more) and distributed uniformly in the material part 110.

The present disclosure may pulverize the N materials into the preset particle size range to produce a powder mixture, mix and stir the N materials pulverized into the preset particle size range with a preset binder while matching with a preset weight % ratio range to produce a liquid mixture, pour the liquid mixture into the case 125 in which M (M≥1) electrode parts 105 are arranged and fixed at preset locations in the internal space, and dry or harden the liquid mixture in a state in which the electrode parts 105 are in close contact with the liquid mixture, thereby producing the material part 110. The binder may bind the N materials pulverized into the preset particle size range or maintain a hardened state of the N materials, while forming a film that prevents the N materials from contacting oxygen in the atmosphere such that the N materials are no longer oxidized. For example, the binder may include an epoxy-based binder. Upon application of eco-friendly regulations, instead of the epoxy, the binder may include a binder (for example, a binder containing 2-Hydroxyethyl methacrylate and toluene d-iso cyanate, a binder containing caster oil and toluene diisocyanate, a binder containing vinyl acetate, etc.) of an eco-friendly material.

According to an embodiment method of the present disclosure, it may be preferable that the material part 110 is maintained in a hardened state within a compressive strength range of at least 85 $kgf/cm^2$ or more. When there is a possibility that a compressive strength of the material part 110 will fail to reach a preset compressive strength range through bonding and hardening by the binder or when it is intended to harden to the preset compressive strength range, a curing agent for hardening the material part 110 within the preset compressive strength range may be added and mixed while matching with a preset weight % ratio range in a process of mixing the N materials with the binder, and then the mixture may be dried and hardened. For example, the curing agent may include an Ascorbic Acid or Fiber Reinforced Plastics (FRP) curing agent.

According to an embodiment method of the disclosure, the material part 110 may need to be maintained in close contact with a preset surface area of the electrode part 105, and, when the electrode part 105 is electrically connected to the electric line 130 to remove thermal energy while the material part 110 is accommodated in the case 125, a surface area of the material part 110, contacting the thermally conductive material of the case 125, may need to be maintained in contact with the thermally conductive material.

Meanwhile, in a process of liquefying and drying the pulverized N materials through the binder, contraction exceeding a preset rate may occur. In this case, at least some of a close contact state between the preset surface area of the electrode part 105 and the material part 110 and a contact state between the surface area of the material part 110 and the thermally conductive material of the case 125 may be damaged. To avoid this, an anti-contraction agent for preventing contraction may be added in and mixed with the liquid mixture liquefied by mixing the binder with the pulverized N materials, while matching with a preset weight % ratio range, and then, the mixture may be dried. For example, the anti-contraction agent may include magnesium oxide or calcium carbonate pulverized into the preset particle size.

The material part 110 may have insulation resistance to be electrically insulated while designated power is applied to the electrode part 105. Preferably, the material part 110 may have insulation resistance of 100 MΩ or more in a state of being hardened within the preset compressive strength range. For example, the material part 110 may have insulation resistance of 100 MΩ or more between the electrode part 105 and a preset surface.

According to an embodiment method of the disclosure, preferably, the material part 110 hardened within the preset compressive strength range may include characteristics of causing no crack at a low voltage (for example, a voltage lower than 1,000 V) while a voltage of 1,000 V or more is applied to the electrode part 105 for one minute or more, or characteristics of causing no crack at a high voltage (for example, a voltage of 1,000 V or more) while a voltage of 12,000 V or more is applied to the electrode part 105 for one minute or more.

Meanwhile, the N materials included in the material part 110 may include n (1≤n≤N) materials through which no current flows and which have magnetism to prevent short circuit between terminals. For example, the n materials having magnetism may include metal oxide materials.

Meanwhile, the N materials included in the material part 110 may include oxides having at least one of electrical insulation characteristics and thermal energy removal characteristics.

According to an embodiment method of the present disclosure, the oxides contained in the N materials may include a mixture state in which an oxidized material is mixed with a non-oxidized material of the same kind within a preset weight % ratio range under conditions with preset electrical insulation characteristics. That is, the present disclosure may not perform a process of calcining or oxidizing the N materials in a process of preparing the N materials and before or after pulverizing the N materials, and thus the oxides may include the mixture state of the oxidized material and the non-oxidized material of the same kind contained in raw materials corresponding to the N materials. However, when a weight % ratio of the oxidized material and the non-oxidized material of the same kind contained in the raw materials is outside a preset range (for example, when an oxidation reaction of the non-oxidized material is detected and/or insulation resistance of the material part 110 is less than 100MΩ while the N materials are pulverized and exposed to the atmosphere), a process of calcining or oxidizing the N materials may be added or the raw materials may be replaced with other raw materials corresponding to the preset weight % ratio of the oxidized material and the non-oxidized material of the same kind.

According to an embodiment method of the present disclosure, preferably, the oxides may be prevented from contacting oxygen in the atmosphere by a film generated by the preset binder, in the state of being pulverized into the preset particle size range and bonded or hardened through the preset binder, and thereby, additional oxidation reactions of materials contained in the oxides may be prevented.

According to an embodiment method of the present disclosure, the oxides contained in the N materials may include aluminum oxide ($Al_2O_3$), and include at least one metal oxide of iron oxide ($Fe_2O_3$), magnesium oxide (MgO), or silicon dioxide ($SiO_2$). Meanwhile, the N materials may further include impurities of preset weight % or less contained in the raw materials in addition to the metal oxide including the aluminum oxide ($Al_2O_3$). However, for convenience, the present disclosure will omit a detailed description of the impurities.

The oxides may have thermal conductivity characteristics in a preset range for removing thermal energy, in the state of being pulverized into the preset particle size range and bonded or hardened through the binder. Also, the oxides may have insulation resistance characteristics in a preset range for electrical insulation, in the state of being pulverized into the preset particle size range and bonded or hardened through the binder.

According to an embodiment method of the present disclosure, the oxides may absorb at least a part of harmonic noise generated through a preset harmonic source (for example, an AC/DC converter or a device generating electromagnetic waves or frequency signals) and entered the electrode part 105 via the electric line 130, and remove the harmonic noise. Alternatively, the oxides containing the metal oxide may reduce harmonic noise inside the electric line 130 by 65% or more by removing thermal energy inside the electric line 130.

According to an embodiment method of the present disclosure, the oxides may maintain thermodynamic stability to minimize thermal expansion or thermal contraction of the material part 110 with respect to a change in temperature, in the state of being pulverized into the preset particle size range and bonded or hardened through the binder.

Meanwhile, the oxides may maintain chemical stability of the material part 110 with respect to external chemical stimuli, in the state of being pulverized into the preset particle size range and bonded or hardened through the binder.

Meanwhile, the oxides may minimize dielectric loss between the electrode part 105 and the material part 110 in the state of being pulverized into the preset particle size range and bonded or hardened through the binder.

According to an embodiment method of the present disclosure, the N materials may preferably contain at least 30 weight % or more of aluminum oxide in order to implement the thermal energy removal characteristics and electrical insulation characteristics.

According to a first embodiment related to a composition of the oxides, the N materials may be produced by containing 30 weight % to 40 weight % of aluminum oxide, 10 weight % to 15 weight % of iron oxide, 20 weight % to 25 weight % of silicon dioxide, and 5 weight % to 10 weight % magnesium oxide in order to implement the thermal energy removal characteristics and electrical insulation characteristics.

According to a second embodiment related to a composition of the oxides, the N materials may be produced by containing 40 weight % to 50 weight % of aluminum oxide, 20 weight % to 30 weight % of silicon dioxide, 5 weight % to 10 weight % of iron oxide, and 5 weight % to 10 weight % magnesium oxide in order to implement the thermal energy removal characteristics and electrical insulation characteristics.

According to a third embodiment related to a composition of the oxides, the N materials may be produced by containing 50 weight % to 60 weight % of aluminum oxide, 20 weight % to 30 weight % of silicon dioxide, and 5 weight % to 10 weight of iron oxide in order to implement the thermal energy removal characteristics and electrical insulation characteristics.

According to a fourth embodiment related to a composition of the oxides, the N materials may be produced by containing 95 weight % to 96 weight % of aluminum oxide and 4 weight % to 5 weight % of impurities ($P_2O_5$, $SO_3$, $K_2O$) in order to implement the thermal energy removal characteristics and electrical insulation characteristics.

According to an embodiment method of the present disclosure, the N materials may be implemented through at least one mineral among bauxite-based materials and tourmaline-based materials, instead of the above-mentioned N materials, for special purposes or uses.

Referring to FIG. 1, the harmonic removal device 100 may further include a connection part 115 for electrically connecting the electrode part 105 to the electric line 130, and/or a fixing part 120 for placing and fixing the electrode part 105 at a preset location inside the material part 110.

The material part 110 may be produced by mixing a powder mixture produced by pulverizing the N materials into the preset particle size range with the binder while matching with the preset weight % ratio range, stirring the mixture, pouring the liquefied liquid mixture into the case 125, and drying or hardening the liquid mixture, and the electrode part 105 may be placed and fixed at a preset location inside the material part 110, which is spaced apart from the surface area of the material part 110 by the preset distance or more. For example, in the material part 110 having a rectangular parallelepiped structure, the electrode part 105 may be placed and fixed at a center portion of the material part 110, which is spaced apart from upper, lower, left, and right sides of the rectangular parallelepiped by the preset distance or more. The fixing part 120 may be provided in the case 125, as shown in FIG. 1, to place and fix the electrode part 105 at the preset location spaced apart from each side of the case 125 by the preset distance or more, and accordingly, the electrode part 105 may be placed and fixed at the preset location inside the material part 110, which is spaced apart from the surface area of the material part 110 by the preset distance or more.

According to an embodiment method of the present disclosure, preferably, the fixing part 120 may have electrical insulation characteristics. The plurality of electrode parts 105 arranged and fixed inside the material part 110 may be insulated from each other due to the electrical insulation characteristics of the fixing part 120 and the electrical insulation characteristics of the material part 110. Meanwhile, the fixing part 120 may be manufactured using a separate insulating material and then used to place and fix the electrode part 105, or the fixing part 120 may be made by containing the same (or equivalent) material as the material constituting the material part 110 and then used to place and fix the electrode part 105. The fixing part 120 and the material part 110 manufactured by containing the same (or equivalent) material may improve thermal energy removal performance of the material part 110 compared to a case in which the fixing part 120 and the material part 110 are manufactured by containing different insulating materials.

According to an embodiment method of the present disclosure, the electrode part 105 may be integrated into the electric line 130 made of an electrically conductive and thermally conductive material. Alternatively, the electrode part 105 may be electrically connected to the electric line 130 through the connection part 115 that is detachable from the electric line 130, as shown in FIG. 1.

The connection part 115 may include at least one, two or more combinations of a contact terminal including a material having both electrical conductivity and thermal conductivity, a fastening bolt including a material having both electrical conductivity and thermal conductivity, and a conducting wire including a material having both electrical conductivity and thermal conductivity and protected by an insulated coating, in order to connect the electrode part 105 to the electric line 130. For example, the connection part 115 may electrically connect the electrode part 105 placed and fixed at the preset location inside the material part 110 through the fixing part 120 to the electric line 130 by using the contact terminal, the fastening bolt, and the conducting wire.

According to an embodiment method of the present disclosure, the material part 110 including the electrode part 105 may connect the electrode part 105 to the electric line 130, in the state of being accommodated in the case 125. In this case, the case 125 accommodating the material part 110 may be maintained in contact with at least one of the surface areas of the material part 110. Meanwhile, preferably, the case 125 may include a thermally conductive material for receiving thermal energy from the surface area of the material part 110 being in contact with the case 125, and thermal energy conducted to the thermally conductive material may be discharged to the atmosphere. However, the thermally conductive material of the case 125 may be electrically insulated from the electric line 130 for safety. Meanwhile, an outer shape of the case 125 may include a geometric structure that matches with a geometric structure of a space for electrically connecting the electrode part 105 included in the material part 110 to the electric line 130.

Meanwhile, according to another embodiment method of the present disclosure, because the material part 110 has electrical insulation characteristics, the case 125 may be omitted and the surface area of the material part 110 may be directly exposed. The present disclosure is not limited to this.

Figure 2:
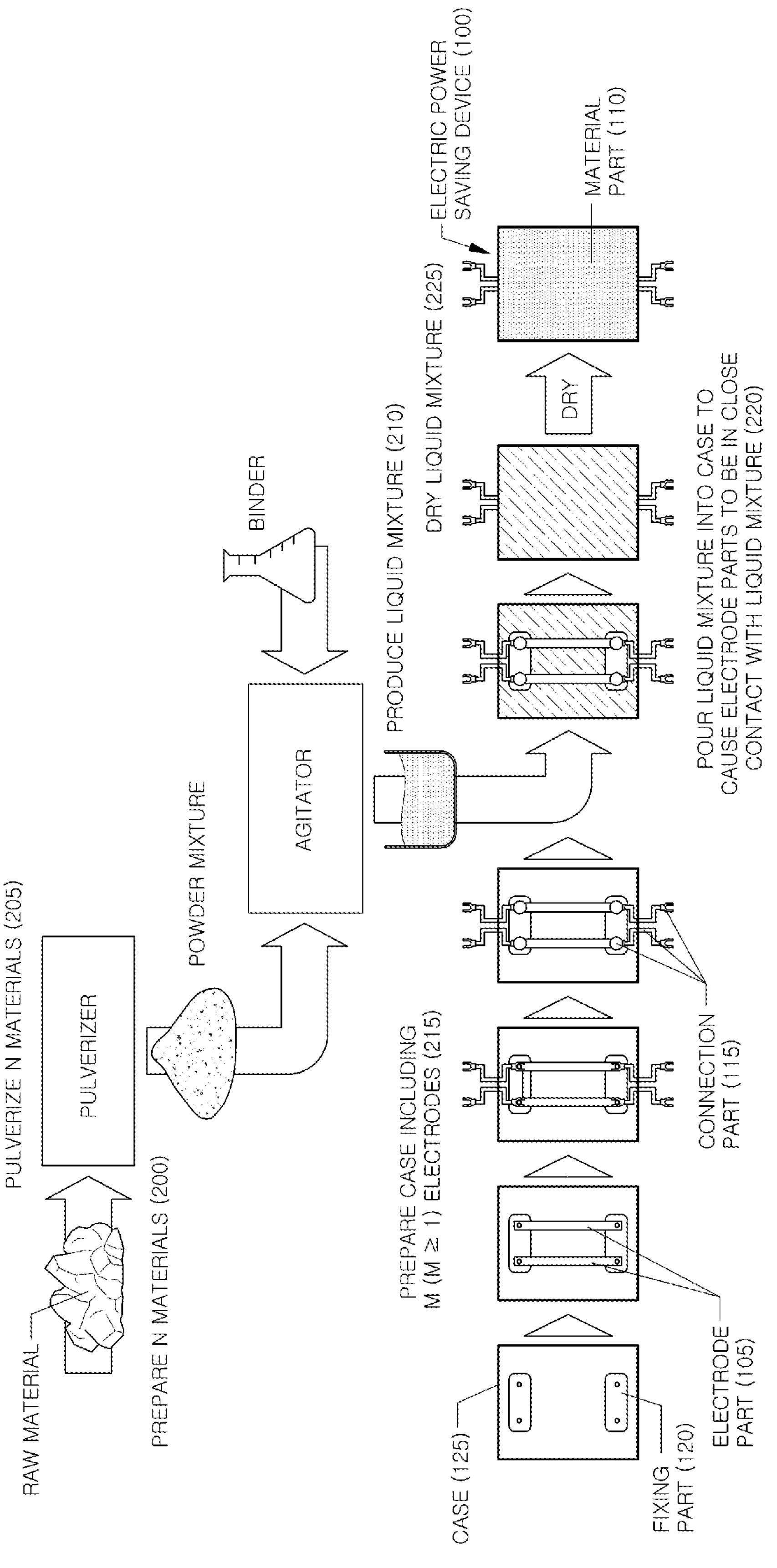
FIG. 2 shows a process of manufacturing a harmonic removal device 100 according to an embodiment method of the disclosure.

FIG. 2 shows a process of manufacturing a harmonic removal device 100 according to an embodiment method of the disclosure.

More specifically, FIG. 2 shows a process of manufacturing the harmonic removal device 100 that includes the material part 110 having thermal energy removal characteristics of removing thermal energy conducted to the electrode part 105 made of a material having electrical conductivity and thermal conductivity, and electrical insulation characteristics with respect to the electrode part 105, and persons of ordinary skill in the technical art to which the present disclosure belongs will be able to infer various embodiment methods (for example, embodiment methods of omitting some operations or changing the order of operations) of the manufacturing process by referring to and/or modifying FIG. 2. However, the present disclosure may include all the inferred embodiment methods and the technical feature of the present disclosure is not limited only to the embodiment method shown in FIG. 2. For convenience, FIG. 2 shows a process of manufacturing a serial harmonic removal device 100.

Referring to FIG. 2, the present disclosure may prepare N materials for implementing electrical insulation characteristics and thermal energy removal characteristics in order to manufacture the harmonic removal device 100 (200).

According to a first embodiment of preparing the N materials, the present disclosure may prepare the N materials by matching with a preset weight % ratio range for each material.

Meanwhile, according to a second embodiment of preparing the N materials, the present disclosure may prepare i (i≥1) raw materials including the N materials each matching with a preset weight % ratio range. For example, the i raw materials may include at least one mineral among bauxite-based materials or tourmaline-based materials.

Meanwhile, according to a third embodiment of preparing the N materials, the present disclosure may prepare j (j≥1) raw materials including s (1≤s≤N) materials among the N materials and prepare t (1≤t≤N) materials for matching weight % for each of the s materials with a preset weight % ratio range. The j raw materials may include at least one mineral among bauxite-based materials or tourmaline-based materials.

The present disclosure may pulverize the prepared N materials into a preset particle size range through a pulverizer to produce a powder mixture (205). Preferably, the present disclosure may pulverize the N materials into particle sizes of 100 mesh or more to produce the powder mixture.

The present disclosure may mix the pulverized N materials with a binder while matching with a preset weight % ratio and then stir the mixture through an agitator to produce a liquefied liquid mixture (210). Meanwhile, when there is a possibility that a compressive strength of a material part 110 hardened by drying the liquid mixture will fail to reach a preset compressive strength range (for example, 85 kgf/$cm^2$ or more) or when it is intended to harden to the preset compressive strength range, the present disclosure may additionally mix a curing agent for hardening the material part 110 within the preset compressive strength range with the liquid mixture while matching with a preset weight % ratio range. Meanwhile, when there is a possibility that contraction exceeding a preset rate or more will occur in a process of drying the liquid mixture, the present disclosure may additionally mix an anti-contraction agent for preventing the contraction with the liquid mixture while matching with a preset weight % ratio range.

Meanwhile, while or before the liquid mixture is produced, the present disclosure may prepare a case 125 in which M (M≥1) electrode parts 105 electrically connected to an electric line 130 and including a material having electrical conductivity and thermal conductivity to conduct thermal energy are arranged and fixed at preset locations (215). Meanwhile, the case 125 may be positioned and fixed at the preset locations inside the case 125 through a fixing part 120, as shown in the example of FIG. 2, and may include a connection part 115 for connecting to the electric line 130. Meanwhile, when a plurality of electrode parts 105 are arranged and fixed inside the case 125, as shown in the example of FIG. 2, the plurality of electrode parts 105 may be arranged and fixed in a state of being electrically insulated from each other.

According to an embodiment method of the disclosure, a number M of the electrode parts 105 may preferably correspond to a number of electric lines 130, and in some cases, an electrode part 105 corresponding to a ground line may be omitted.

The present disclosure may pour the liquid mixture into an inside space of the case 125 in which the M electrode parts 105 are arranged and fixed at the preset locations to cause the electrode parts 105 to be in close contact with the liquid mixture (220). According to an embodiment method of the disclosure, a vibrator (not shown) may vibrate the liquid mixture poured into the case 125 to improve adhesion between the electrode parts 105 and the liquid mixture.

Meanwhile, in a case in which the material part 110 is taken out of the case 125 and then the electrode parts 105 are electrically connected to the electric line 130 to be used as a harmonic removal device 100, a releasing agent (not shown) for releasing the material part 110 may be applied onto an inner surface of the case 125 and then the liquid mixture may be poured into the case 125.

The present disclosure may manufacture the harmonic removal device 100 including the material part 110 having electrical insulation characteristics and thermal energy removal characteristics of removing thermal energy inside the electric line 130, conducted to the electrode parts 105 by drying or hardening the liquid mixture while maintaining the liquid mixture in close contact with the electrode parts 105 (225). Meanwhile, in the case in which the material part 110 is taken out of the case 125 and then the electrode parts 105 are electrically connected to the electric line 130 to be used as the harmonic removal device 100, the harmonic removal device 100 including the material part 110 taken out of the case 125 may be manufactured.

Figure 3:
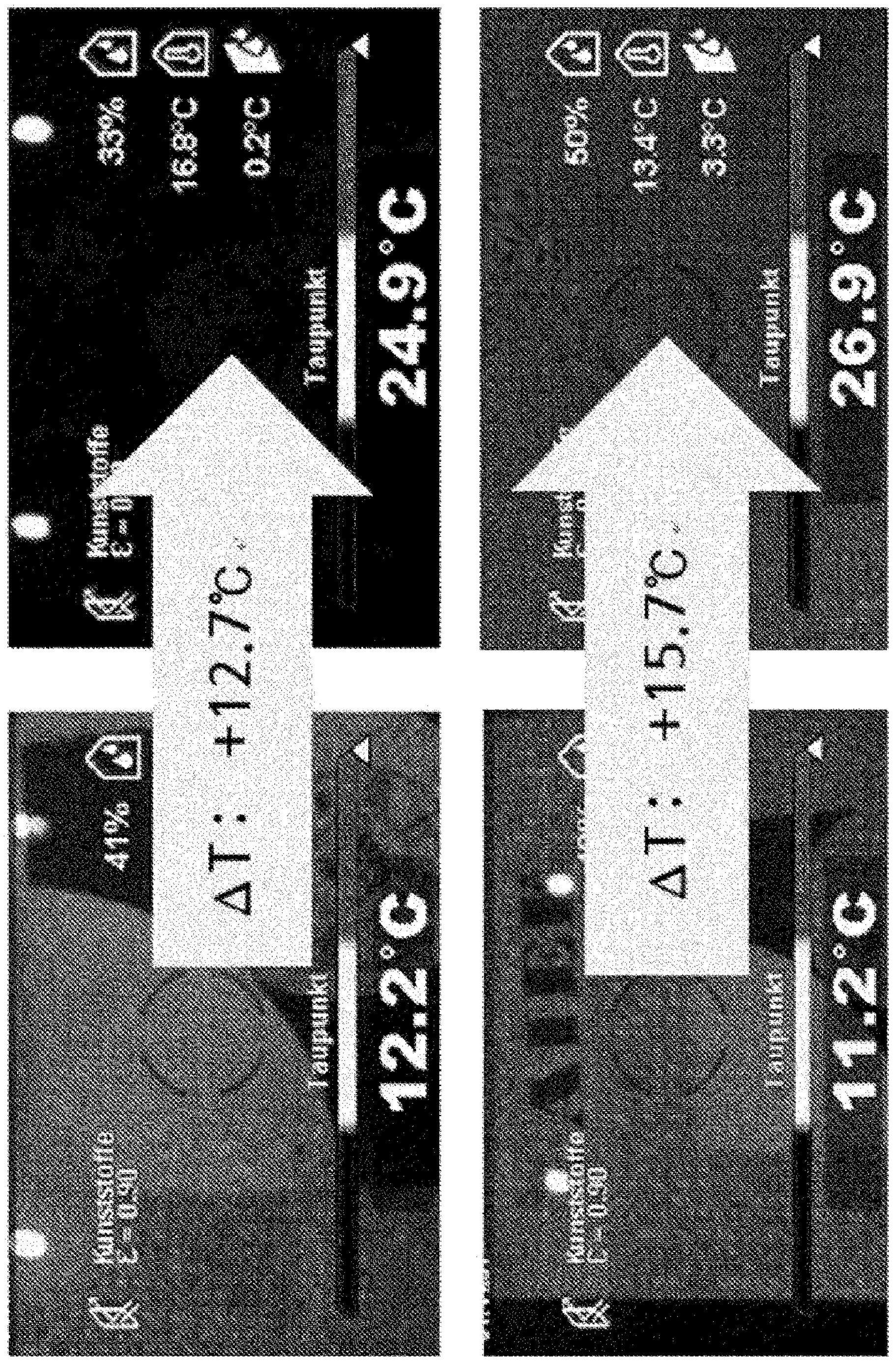
FIG. 3 is a diagram showing surface temperature of a harmonic removal device 100 of removing thermal energy according to an embodiment method of the disclosure.

FIG. 3 is a diagram showing surface temperature of a harmonic removal device 100 of removing thermal energy according to an embodiment method of the disclosure.

More specifically, FIG. 3 is a diagram obtained by photographing surface temperature of the harmonic removal device 100 using a thermal imaging camera, wherein (a) in FIG. 3 was obtained by photographing the harmonic removal device 100 through the thermal imaging camera before connecting the harmonic removal device 100 to the electric line 130 or before applying power to the electric line 130 connected to the harmonic removal device 100, and (b) in FIG. 3 was obtained by photographing the harmonic removal device 100 through the thermal imaging camera after connecting the harmonic removal device 100 to the electric line 130 or after applying power to the electric line 130 connected to the harmonic removal device 100.

Referring to (a) of FIG. 3, surface temperature of the harmonic removal device 100 before the harmonic removal device 100 is connected to the electric line 130 or before power is applied to the electric line 130 connected to the harmonic removal device 100 was 12.2° C. and 11.2° C. Meanwhile, referring to (b) of FIG. 3, when 10 minutes or more elapse after the harmonic removal device 100 is connected to the electric line 130 or power is applied to the electric line 130 connected to the harmonic removal device 100, surface temperature of the harmonic removal device 100 was 24.9° C. and 26.9° C. risen by 12.7° C. and 15.7° C., respectively. This means that thermal energy inside the electric line 130 was conducted to the harmonic removal device 100. At this time, the surface temperature of the electric line 130 may include temperature matching with surface temperature of the harmonic removal device 100 within an error range of a first decimal place.

Figure 4:
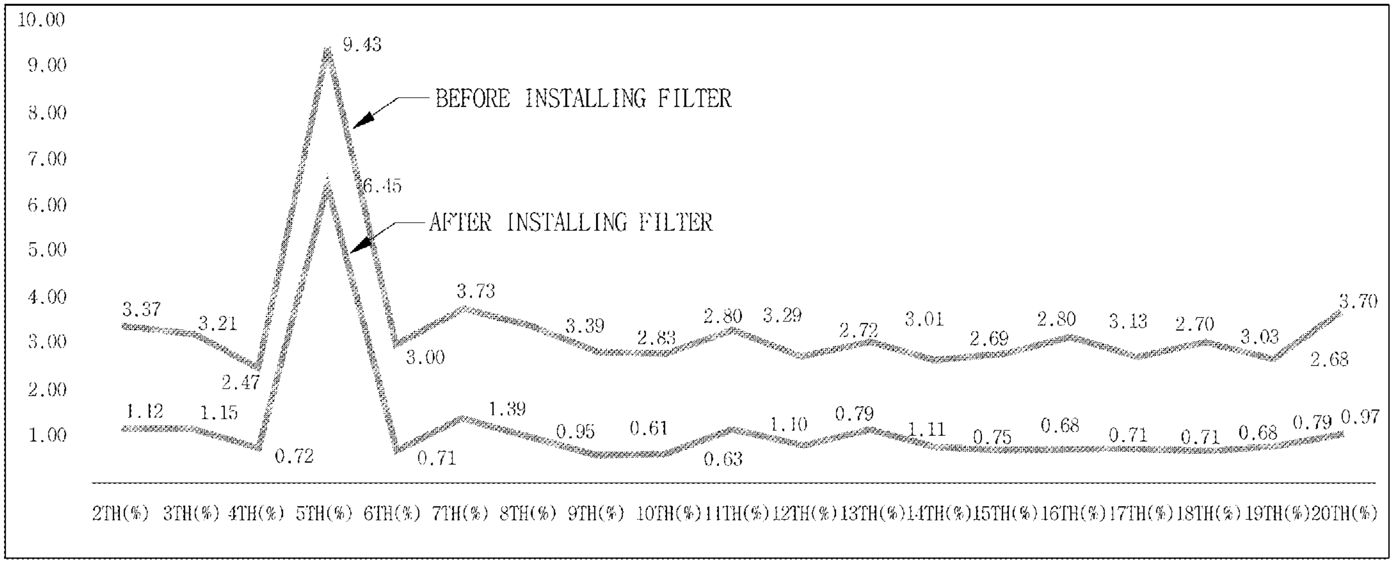
FIG. 4 is a diagram showing harmonics reduction through thermal energy removal from an electric line 130 according to an embodiment method of the disclosure.

FIG. 4 is a diagram showing harmonics reduction through thermal energy removal from an electric line 130 according to an embodiment method of the disclosure.

More specifically, FIG. 4 is a diagram obtained by measuring harmonic generation rates before and after connecting the harmonic removal device 100 according to the present disclosure to a high-voltage compressor using 6,600V power in a semiconductor factory. Referring to FIG. 4, $2^{nd}$ to $20^{th}$ harmonics were measured under the same conditions before and after the harmonic removal device 100 according to the present disclosure is connected, and compared to before the harmonic removal device 100 is connected, 69.58% or more of harmonics on average were removed.

Comparing the conventional harmonic removal technology to technology of the harmonic removal device 100 according to the present disclosure, while the conventional harmonic removal technology uses the resonance principle, the present disclosure may use a thermal energy removal method. While an internal configuration of the conventional harmonic removal technology uses L and C circuits, the present disclosure may use metal oxide. While a harmonic removal rate of the conventional harmonic removal technology is about 20% to 30%, a harmonic removal rate of the present disclosure may be about 65%. While the conventional harmonic removal technology is affected by frequency or impedance, the present disclosure may not be affected by frequency or impedance. While the conventional harmonic removal technology requires installation for each order of harmonics, the present disclosure may remove or reduce all orders of harmonics by installing one harmonic removal device 100 regardless of the orders. While the conventional harmonic removal technology removes harmonics of only low voltages, the present disclosure may remove all harmonics of low voltages and high voltages. While the conventional harmonic removal technology generates noise or vibration during use, the present disclosure may generate neither noise nor vibration. While the conventional harmonic removal technology has a lifespan of about 3 to 10 years due to failure or deterioration of parts, the present disclosure may be usable for at least 30 years because of causing neither failure nor deterioration. While the conventional harmonic removal technology continuously incurs maintenance costs during a period of use, the present disclosure may not incur any maintenance costs after installation. While the conventional harmonic removal technology has a risk of explosion or fire during use, the present disclosure may have no risk of explosion or fire. While the conventional harmonic removal technology has an electrical effect on operations or performance of existing equipment, the present disclosure may remove harmonics of the electric line 130 without any effect on existing equipment.

According to the disclosure, by connecting the passive harmonic removal device according to the disclosure to an electric line to remove thermal energy inside the electric line, intensities of all harmonics in the electric line may be reduced by 65% or more. The removal rate may be a reduction rate that is higher than that of active harmonic filters in industrial factories. Accordingly, advantages of preventing a fire or burnout due to excessive current supply to neutral lines, suppressing deterioration of electronic components, lowering a failure rate, and reducing power loss may be obtained.

The invention claimed is:

1. A passive harmonic removal device, comprising:

a material part connected to an electric line in an electrically insulated state and including N (N≥2) materials to which thermal energy of the electric line is conducted and which the thermal energy is removed, wherein the passive harmonic removal device is configured to simultaneously reduce intensities of all $2^{nd}$ to $50^{th}$ harmonics existing on the electric line through the material part, wherein the N materials include oxides having electrical insulation characteristics and thermal energy removal characteristics, wherein the oxides include 95 to 96 wt % of aluminum oxide; and 4 to 5 wt % of impurities consisting of $P_2O_5$, $SO_3$ and $K_2O$, wherein the material part has a compressive strength range of at least 85 kgf/$cm^2$ or more, wherein the material part has an insulation resistance of 100 MΩ or more, and wherein the passive harmonic removal device reduces intensities of $2^{nd}$ to $50^{th}$ harmonics existing in the electric line connected to an electrode part by 65% or more.

2. The passive harmonic removal device of claim 1, wherein the material part is in close contact with the electrode part made of a material having electrical conductivity and thermal conductivity, and the thermal energy of the electric line electrically connected to the electrode part is conducted to the material part and removed by the material part.

3. The passive harmonic removal device of claim 2, wherein the material part is configured to remove the thermal energy generated in the electric line and primarily conducted to the electrode part.

4. The passive harmonic removal device of claim 2, wherein the material part is configured to remove the thermal energy generated in a designated source electrically connected to the electric line, primarily conducted to the electric line, and then secondarily conducted to the electrode part.

5. The passive harmonic removal device of claim 2, wherein the material part is maintained in a thermal equilibrium state corresponding to a surface temperature within a preset allowable temperature range with respect to a temperature of the electric line while power of the electric line is applied to the electrode part.

6. The passive harmonic removal device of claim 2, wherein the material part is maintained in a thermal equilibrium state corresponding to a surface temperature below atmosphere temperature while power of the electric line is applied to the electrode part.

7. The passive harmonic removal device of claim 2, wherein the material part is maintained in a thermal equilibrium state corresponding to a surface temperature within a preset temperature range in a range of 18° C. to 35° C. while power of the electric line is applied to the electrode part.

8. The passive harmonic removal device of claim 5, wherein, when the surface temperature of the material part is outside the thermal equilibrium state, the material part is maintained in the thermal equilibrium state by increasing a volume or a surface area of the material part by multiply-connecting a plurality of material parts to the electric line by a preset electrical connection method.

9. The passive harmonic removal device of claim 1, wherein the N materials are maintained in a state of being pulverized into a preset particle size range and distributed uniformly in the material part.

10. The passive harmonic removal device of claim 1, wherein the material part is maintained in a state hardened by a mixture of the N materials pulverized into a preset particle size range and a preset binder while matching with a preset weight % ratio range and drying the mixture.

11. The passive harmonic removal device of claim 10, wherein the preset binder is configured to prevent the N materials from contacting oxygen in an atmosphere.

12. The passive harmonic removal device of claim 1, wherein the material part includes characteristics of causing no crack at a low voltage while a voltage of 1,000 V or more is applied to the electrode part for one minute or more, or characteristics of causing no crack at a high voltage while a voltage of 12,000 V or more is applied to the electrode part for one minute or more.

13. The passive harmonic removal device of claim 6, wherein, when the surface temperature of the material part is outside the thermal equilibrium state, the material part is maintained in the thermal equilibrium state by increasing a volume or a surface area of the material part by multiply-connecting a plurality of material parts to the electric line by a preset electrical connection method.

14. The passive harmonic removal device of claim 7, wherein, when the surface temperature of the material part is outside the thermal equilibrium state, the material part is maintained in the thermal equilibrium state by increasing a volume or a surface area of the material part by multiply-connecting a plurality of material parts to the electric line by a preset electrical connection method.

* * * * *